United States Patent
Park et al.

(10) Patent No.: US 11,869,720 B2
(45) Date of Patent: Jan. 9, 2024

(54) DIELECTRIC COMPOSITION AND MULTILAYER ELECTRONIC COMPONENT INCLUDING THE SAME

(71) Applicant: SAMSUNG ELECTRO-MECHANICS CO., LTD., Suwon-si (KR)

(72) Inventors: Jae Sung Park, Suwon-si (KR); Hyoung Uk Kim, Suwon-si (KR); Hyung Soon Kwon, Suwon-si (KR); Jong Han Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 7 days.

(21) Appl. No.: 17/675,346

(22) Filed: Feb. 18, 2022

(65) Prior Publication Data

US 2022/0172896 A1    Jun. 2, 2022

Related U.S. Application Data

(63) Continuation of application No. 16/842,388, filed on Apr. 7, 2020, now Pat. No. 11,348,729.

(30) Foreign Application Priority Data

Sep. 20, 2019  (KR) .......... 10-2019-0115901

(51) Int. Cl.
*H01G 4/12*  (2006.01)
*H01G 4/012*  (2006.01)
(Continued)

(52) U.S. Cl.
CPC ....... *H01G 4/1209* (2013.01); *C04B 35/4682* (2013.01); *C04B 35/6264* (2013.01);
(Continued)

(58) Field of Classification Search
CPC .... H01G 4/1209; H01G 4/012; H01G 4/1218; H01G 4/248; H01G 4/30; C04B 35/4682;
(Continued)

(56) References Cited

U.S. PATENT DOCUMENTS 6,917,513 B1    7/2005  Kim et al.
8,593,038 B2 *  11/2013  Kang .................. H01F 17/0013
                                                    501/137
(Continued)

FOREIGN PATENT DOCUMENTS

JP    2005-298315 A    10/2005
JP    2013-227219 A    11/2013
(Continued)

OTHER PUBLICATIONS

Chinese Office Action dated Jul. 29, 2022, issued in corresponding Chinese Patent Application No. 202010596105.3.
(Continued)

*Primary Examiner* — Karl E Group
*Assistant Examiner* — Cameron K Miller
(74) *Attorney, Agent, or Firm* — Morgan, Lewis & Bockius LLP

(57) ABSTRACT

A dielectric composition includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component, a first subcomponent including a rare earth element, and a second subcomponent including at least one of a variable valence acceptor element and a fixed valence acceptor element. When a sum of contents of the rare earth element is defined as DT and a sum of contents of the variable valence acceptor element and the fixed valence acceptor element is defined as AT, (DT/AT)/(Ba+Ca) satisfies more than 0.5 and less than 6.0. In addition, a multilayer electronic component including the dielectric composition is provided.

17 Claims, 4 Drawing Sheets

(51) Int. Cl.
- *H01G 4/248* (2006.01)
- *C04B 35/468* (2006.01)
- *C04B 35/626* (2006.01)
- *C04B 35/638* (2006.01)
- *C04B 35/64* (2006.01)
- *H01G 4/30* (2006.01)
- *H01B 3/02* (2006.01)
- *H01B 3/10* (2006.01)

(52) U.S. Cl.
CPC ............ *C04B 35/638* (2013.01); *C04B 35/64* (2013.01); *H01B 3/02* (2013.01); *H01B 3/10* (2013.01); *H01G 4/012* (2013.01); *H01G 4/1218* (2013.01); *H01G 4/248* (2013.01); *H01G 4/30* (2013.01); *C04B 2235/3206* (2013.01); *C04B 2235/3215* (2013.01); *C04B 2235/3217* (2013.01); *C04B 2235/3224* (2013.01); *C04B 2235/3236* (2013.01); *C04B 2235/3244* (2013.01); *C04B 2235/3418* (2013.01); *C04B 2235/36* (2013.01); *C04B 2235/442* (2013.01); *C04B 2235/6025* (2013.01); *C04B 2235/656* (2013.01); *C04B 2235/6582* (2013.01); *C04B 2235/781* (2013.01); *C04B 2235/785* (2013.01)

(58) Field of Classification Search
CPC .... C04B 2235/3206; C04B 2235/3215; C04B 2235/3217; C04B 2235/3224; C04B 2235/3244; C04B 2235/3418; C04B 2235/781; C04B 2235/785; H01B 3/02; H01B 3/10

See application file for complete search history.

(56) References Cited

U.S. PATENT DOCUMENTS

| | | |
|---|---|---|
| 9,153,382 B2 | 10/2015 | Okamoto et al. |
| 2007/0284792 A1 | 12/2007 | Yanagida et al. |
| 2013/0294007 A1 | 11/2013 | Okamoto et al. |
| 2014/0218840 A1 | 8/2014 | Kang et al. |
| 2014/0285950 A1* | 9/2014 | Morita ............... H01G 4/012 361/321.2 |
| 2016/0194248 A1 | 7/2016 | Yoon et al. |
| 2017/0032895 A1 | 2/2017 | Ogata et al. |
| 2017/0190626 A1 | 7/2017 | Yoon et al. |
| 2018/0033555 A1 | 2/2018 | Yoon et al. |
| 2018/0130601 A1 | 5/2018 | Kim et al. |
| 2019/0066920 A1 | 2/2019 | Kim et al. |

FOREIGN PATENT DOCUMENTS

| | | |
|---|---|---|
| JP | 2017-028225 A | 2/2017 |
| JP | 2018-016538 A | 2/2018 |
| KR | 10-2007-0118556 A | 12/2007 |
| KR | 10-0990875 B1 | 11/2010 |
| KR | 10-2013-0122770 A | 11/2013 |
| KR | 10-2014-0100218 A | 8/2014 |
| KR | 10-2017-0081861 A | 7/2017 |

OTHER PUBLICATIONS

Korean Office Action dated Apr. 5, 2023, issued in corresponding Korean Patent Application No. 10-2021-0114352.

Office Action issued in corresponding Korean Patent Application No. 10-2019-0115901 dated Nov. 20, 2020, with English translation.

Office Action dated Nov. 7, 2023 in the related Japanese Patent Application No. 2020-071357 w/English translation.

* cited by examiner

DIELECTRIC COMPOSITION AND MULTILAYER ELECTRONIC COMPONENT INCLUDING THE SAME

CROSS-REFERENCE TO RELATED APPLICATION(S)

The present application is the continuation application of U.S. patent application Ser. No. 16/842,388 filed Apr. 7, 2020, which claims the benefit under 35 USC 119(a) of Korean Patent Application No. 10-2019-0115901 filed on Sep. 20, 2019 in the Korean Intellectual Property Office, the entire disclosures of which are incorporated herein by reference for all purposes.

BACKGROUND

1. Field

The present disclosure relates to a dielectric composition and a multilayer electronic component including the same.

2. Description of Related Art

In general, electronic components using a ceramic material, such as capacitors, inductors, piezoelectric elements, varistors, or thermistors, include a ceramic body formed of a ceramic material, an internal electrode formed inside the body, and an external electrode disposed on the surface of the ceramic body to be connected to the internal electrode.

Recently, as electronic products have become smaller and more multifunctional, chip components have become smaller and higher in functionality. Therefore, as multilayer ceramic capacitors (MLCCs) as multilayer electronic components, smallsized and high-capacity products have also been required.

To obtain miniaturization and high capacity of multilayer ceramic capacitors at the same time, a large number of layers are laminated by reducing the thicknesses of the dielectric layer and the electrode layer therein, and at present, the thickness of a dielectric layer is about 0.6 µm, and the development of dielectric layers with further reduced thicknesses continues.

Due to the trend for higher levels of capacitance and ultra-thin layers in multilayer ceramic capacitors, it is essential to design compositions for multilayer ceramic capacitors having high dielectric constants.

In such a situation, securing the reliability of the dielectric layer has emerged as an important issue of dielectric materials, and also, it is an important problem that quality and yield management are difficult due to an increase in dielectric insulation resistance deterioration.

To solve this problem, there is a need for a new method for securing high reliability not only in the structural aspect of the multilayer ceramic capacitor but also in terms of the composition of dielectric.

In general, in the related art to secure high dielectric properties, a high dielectric constant is secured by simply causing the grain growth to adjust the number of dipoles in a crystal. However, according to the related art, the capacitance change rate depending on temperature and DC voltage increases when designing a high dielectric constant composition by grain growth, and problems such as a decrease in reliability due to a decrease in the number of particles per dielectric layer may occur at the same time.

Therefore, to manufacture a dielectric composition in which a capacity reduction rate according to DC voltage is not increased, while implementing high dielectric properties without deterioration of reliability even in a case in which the dielectric layer is thinned; a method of increasing the dielectric constant without accompanying grain growth is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a dielectric composition capable of improving reliability and a multilayer electronic component including the same.

An aspect of the present disclosure is to provide a dielectric composition capable of improving a dielectric constant and a multilayer electronic component including the same.

An aspect of the present disclosure is to provide a dielectric composition capable of significantly reducing a decrease in withstand voltage, while having a thin dielectric layer, and a multilayer electronic component including the same.

According to an aspect of the present disclosure, a dielectric composition includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component, a first subcomponent including a rare earth element, and a second subcomponent including at least one of a variable valence acceptor element and a fixed valence acceptor element. When a sum of contents of the rare earth element is defined as DT and a sum of contents of the variable valence acceptor element and the fixed valence acceptor element is defined as AT, $(DT/AT)/(Ba+Ca)$ satisfies more than 0.5 and less than 6.0.

According to an aspect of the present disclosure, a multilayer electronic component includes a body including a dielectric layer and an internal electrode, and an external electrode disposed on the body and connected to the internal electrode. The dielectric layer includes a dielectric composition. The dielectric composition includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component, a first subcomponent comprising a rare earth element, and a second subcomponent comprising at least one of a variable valence acceptor element and a fixed valence acceptor element. When a sum of contents of the rare earth element is defined as DT, and a sum of contents of the variable valence acceptor element and the fixed valence acceptor element is defined as AT, $(DT/AT)/(Ba+Ca)$ satisfies more than 0.5 and less than 6.0.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
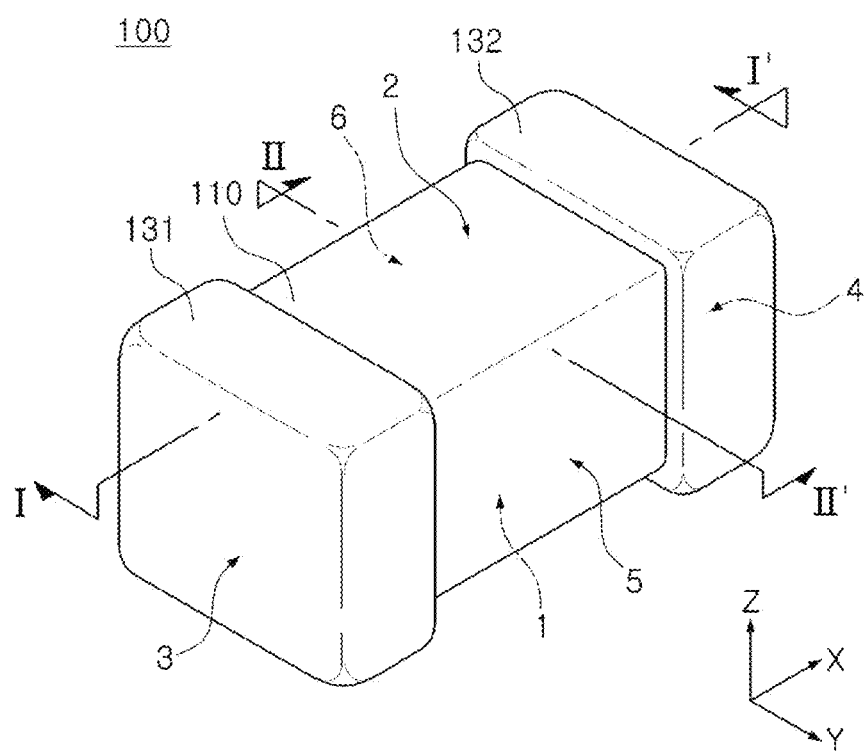
FIG. 1 schematically illustrates a perspective view of a multilayer electronic component according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

In the drawings, the X direction may be defined as the second direction, L direction or length direction, the Y direction may be defined as the third direction, W direction or width direction; and the Z direction may be defined as the first direction, stacking direction, T direction, or thickness direction.

Dielectric Composition

A dielectric composition according to an embodiment includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component, a first subcomponent comprising a rare earth element, and a second subcomponent comprising at least one of a variable valence acceptor element and a fixed valence acceptor element. In this case, when the sum of the rare earth element contents is defined as DT and the sum of the valence variable acceptor element and fixed valence acceptor element contents is defined as AT, (DT/AT)/(Ba+Ca) satisfies more than 0.5 and less than 6.0.

Due to the trend toward higher capacities and ultra-thin layers of multilayer ceramic capacitors, it is essential to design a composition for a multilayer ceramic capacitor having a high dielectric constant.

In general, in the related art for securing high dielectric properties, a high dielectric constant is secured by controlling the number of dipoles in the crystal by simply causing the growth of the particle. However, according to the related art, in designing a high dielectric constant composition by particle growth, the capacity change rate according to temperature and DC voltage increases, and problems such as a decrease in reliability due to a decrease in the number of particles per dielectric layer may occur at the same time.

To manufacture a dielectric composition in which high dielectric properties may be implemented without deterioration of reliability and a capacity reduction rate due to DC voltage does not increase even in the case in which the dielectric layer is thinned, a method of increasing the dielectric constant without accompanying grain growth is required.

In embodiments of the present disclosure, by controlling the correlation between the rare earth element content, the acceptor element and fixed valence acceptor element contents, and barium (Ba) and calcium (Ca) contents, contained in the dielectric composition; high dielectric constant and high reliability may be both obtained by intentionally, slightly increasing the current density and reducing the oxygen vacancy defect generation concentration, thereby improving insulation resistance and a dielectric constant per grain size. In addition, a dielectric composition without the reduction in aging characteristics, DC electric field dependency, and the like may be provided.

The main components, $BaTiO_3$, $(Ba,Ca)(Ti,Ca)O_3$, $(Ba,Ca)(Ti,Zr)O_3$, $Ba(Ti,Zr)O_3$, and $(Ba,Ca)(Ti,Sn)O_3$, have the perovskite structure represented by $ABO_3$, in which oxygen vacancies may occur, in which the place where oxygen should be present is empty. For example, oxygen vacancy may occur when firing is performed in a reducing atmosphere, and oxygen vacancy may occur when carbon is evaporated in the form of $CO_2$ by combining with oxygen of $ABO_3$ by debinder or the like.

For example, O has a charge of −2, and if the place where oxygen should be present is empty, oxygen vacancies with a charge of +2 occur, and when oxygen vacancies are moved by an applied electric field, reliability is lowered. In addition, in this case, as oxygen vacancies increase, and the higher the temperature and voltage, the higher the moving speed and the moving amount, further worsening the reliability.

To solve the problem of oxygen vacancies, in general, a method of improving reliability by reducing the concentration of oxygen vacancies by adding rare earth elements is known. However, there has been a problem in which the dielectric constant per grain size is lowered or the insulation resistance is lowered due to excessive semiconductorization.

Thus, in examples of the present disclosure, when the sum of the content of the rare earth element content is DT, and the sum of the contents of the variable valence acceptor element and the fixed valence acceptor element is defined as AT, (DT/AT)/(Ba+Ca) may be greater than 0.5 and less than 6.0, thereby improving the dielectric constant per grain size to ensure high dielectric properties while significantly reducing grain growth, and thus, securing insulation resistance.

If a value ((DT/AT)/(Ba+Ca)) obtained by dividing the ratio (DT/AT) of the sum (DT) of the rare earth element contents to the sum (AT) of the contents of the variable valence acceptor element and the fixed valence acceptor element by the sum (Ba+Ca) of Ba content and Ca content, is 0.5 or less, the dielectric constant per grain size may be relatively low. Therefore, the (DT/AT)/(Ba+Ca) may be more than 0.5, in more detail, 0.7 or more, in further detail, 1.0 or more.

If (DT/AT)/(Ba+Ca) is 6.0 or more, there is a fear that the insulation resistance may decrease as the charge density increases. In addition, due to increase of the concentration and the generation of the electronic charge carrier represented by the following defect rate formula, the electrical conductivity in the dielectric layer of the multilayer ceramic capacitor may increase rapidly, thereby causing the problem in that the reduction resistance is lowered.

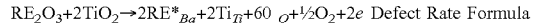
$RE_2O_3 + 2TiO_2 \rightarrow 2RE^*_{Ba} + 2Ti_{Ti} + 6O_O + \frac{1}{2}O_2 + 2e$ Defect Rate Formula Therefore, (DT/AT)/(Ba+Ca) is, in detail, less than 6.0, in more detail 5.5 or less, in further detail 5.0 or less.

In this case, the rare earth element includes lanthanum (La), and further includes at least one of yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Lu), and the content ratio (La/DT) of the lanthanum (La) to the sum (DT) of the rare earth element contents may satisfy 0.1 or more and less than 1.0.

Lanthanum (La) may effectively replace the Ba site, and is thus more effective in reducing the oxygen vacancies defect concentration, and may serve to suppress grain growth.

If La/DT is less than 0.1, the lanthanum addition effect may be insufficient. Therefore, La/DT may be 0.1 or more. To more reliably secure the effect of adding lanthanum (La), La/DT may be greater than 0.1, and in further detail, may be 0.2 or more.

On the other hand, if La/DT is 1.0, the insulation resistance may decrease as the charge density increases, and the electrical conductivity in the dielectric layer of the multilayer ceramic capacitor rapidly increases due to the generation and increased concentration of the electronic charge carrier, and thus, a problem of deterioration in reduction resistance may occur. Accordingly, La/DT may be less than 1.0, in more detail, 0.9 or less, in further detail, 0.8 or less.

Figure 5:
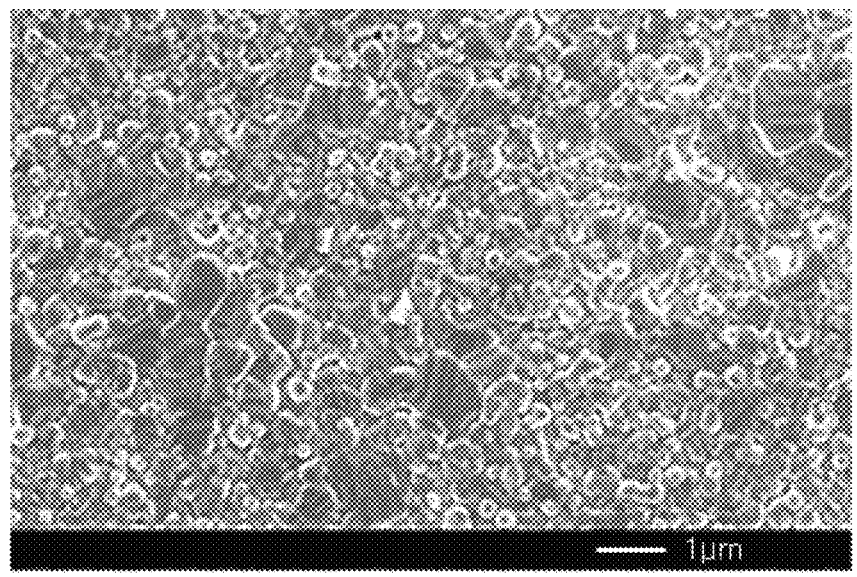
FIG. 5 is an image provided by capturing crystal grains of a dielectric layer formed using a dielectric composition in which La and Dy are added as a rare earth element.

FIG. 5 is an image provided by capturing crystal grains of a dielectric layer formed using a dielectric composition in which La and Dy are added as a rare earth element.

Figure 6:
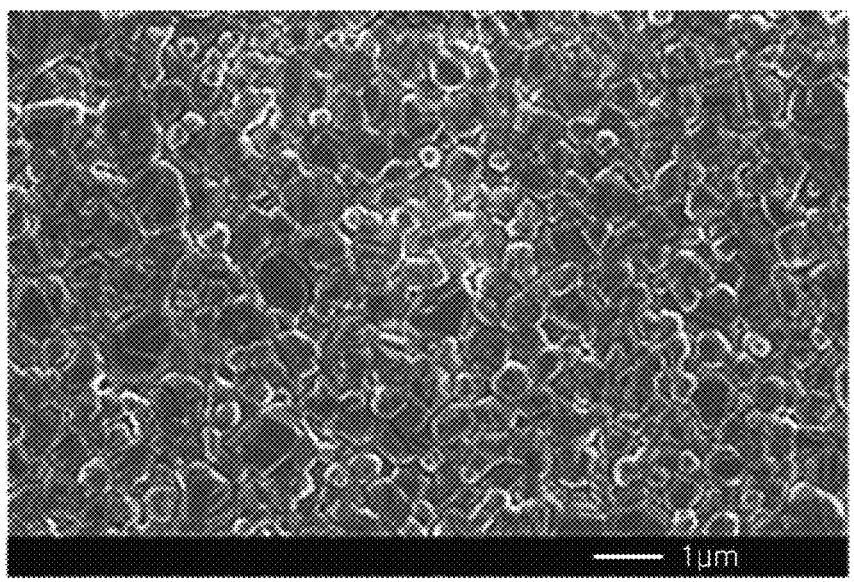
FIG. 6 is an image provided by capturing crystal grains of a dielectric layer formed using a dielectric composition in which only Dy is added as a rare earth element.

FIG. 6 is an image provided by capturing crystal grains of a dielectric layer formed using a dielectric composition in which only Dy is added as a rare earth element.

Referring to FIGS. 5 and 6, it can be seen that the grains of the dielectric layer formed by using the dielectric composition in which La and Dy are added are smaller than when only Dy is added.

The dielectric layer of FIG. 5 has a dielectric constant (ε) of 3240 and the dielectric layer of FIG. 6 has a dielectric constant (ε) of 2430. Therefore, it can be confirmed that the dielectric constant per grain size of the dielectric layer formed using the dielectric composition in which La and Dy are added is higher than when only Dy is added.

Hereinafter, each component of the dielectric composition according to an embodiment will be described in detail.

a) Main Component

A dielectric composition according to an embodiment includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component.

In a more detailed example, the dielectric composition may include at least one selected from the group consisting of $BaTiO_3$, $(Ba_{1-x}Ca_x)(Ti_{1-y}Ca_y)O_3$ (where x is $0 \leq x \leq 0.3$ and y is $0 \leq y \leq 0.1$), $(Ba_{1-x}Ca_x)(Ti_{1-y}Zr_y)O_3$ (where x is $0 \leq x \leq 0.3$ and y is $0 \leq y \leq 0.5$), $Ba(Ti_{1-y}Zr_y)O_3$ ($0 < y \leq 0.5$) and $(Ba_{1-x}Ca_x)(Ti_{1-y}Sn_y)O_3$ (where x is $0 \leq x \leq 0.3$ and y is $0 \leq y \leq 0.1$).

A dielectric composition according to an embodiment may have a room temperature dielectric constant of 2000 or more.

The main component is not particularly limited, but the average particle diameter of the main component powder may be 40 nm or more and 200 nm or less.

b) First Subcomponent

According to an embodiment of the present disclosure, the dielectric composition includes a first subcomponent comprising a rare earth element.

The rare earth element replaces the A-site of the $ABO_3$ structure and serves as a donor, thereby reducing the concentration of oxygen vacancies and thus improving reliability. In addition, the rare earth element acts as a barrier to prevent the flow of electrons at the grain boundary, thereby suppressing an increase in leakage current.

In this case, the first subcomponent may include 0.2 mole or more and 4.0 moles or less of an oxide or carbonate containing the rare earth element, relative to 100 moles of the main component.

If the content of the oxide or carbonate containing the rare earth element is less than 0.2 mol relative to 100 moles of the main component, the above-described effects may be insufficient.

On the other hand, as the rare earth element content increases, it is advantageous in terms of reliability improvement. However, if the content of the oxide or carbonate containing the rare earth element is more than 4.0 moles relative to 100 moles of the main component, the characteristics of the insulator and sinterability may decrease due to semiconductorization.

c) Second Subcomponent

According to an embodiment, the dielectric composition includes a second subcomponent comprising at least one of a variable valence acceptor element and a fixed valence acceptor element.

The variable valence acceptor element and the fixed valence acceptor element mainly act as acceptors by substituting the B-site of the $ABO_3$ structure, and may serve to reduce the electron concentration, and thus, may serve to suppress semiconductorization of the dielectric layer by A-site solid solution of a rare earth element. In addition, the variable valence acceptor element and the fixed valence acceptor element may serve to lower the firing temperature and improve the high temperature withstand voltage characteristics of the multilayer ceramic capacitor to which the dielectric composition is applied.

To this end, as described above, when the sum of the rare earth element contents is defined as DT, and the sum of the variable valence acceptor element and the fixed valence acceptor element contents is defined as AT, (DT/AT)/(Ba+ Ca) may satisfy 0.5 or more and less than 6.0 by adding one or more of the variable valence acceptor element and the fixed valence acceptor element. Thus, the dielectric constant per grain size may be improved to ensure high dielectric properties while significantly reducing grain growth.

In this case, the variable valence acceptor element may include at least one of manganese (Mn), vanadium (V), chromium (Cr), iron (Fe), nickel (Ni), cobalt (Co), copper (Cu) and zinc (Zn), and the fixed valence acceptor element includes at least one of magnesium (Mg) and zirconium (Zr).

In addition, the second subcomponent may include 0.01 mole or more and 4.0 moles or less of an oxide or carbonate containing one or more of the variable valence acceptor element and the fixed valence acceptor element, relative to 100 moles of the main component.

If the oxide or carbonate containing at least one of the variable valence acceptor element and the fixed valence acceptor element is less than 0.01 mol relative to 100 moles of the main component, it may be difficult to suppress the semiconductorization of the dielectric layer due to the addition of the rare earth element, and there is a possibility that the firing temperature may be increased and the high temperature withstand voltage characteristics are slightly lowered.

On the other hand, if the oxide or carbonate containing one or more of the variable valence acceptor element and the fixed valence acceptor element is more than 4.0 moles relative to 100 moles of the main component, the breakdown voltage (BDV) or room temperature specific resistance may decrease.

c) Third Subcomponent

According to an embodiment of the present disclosure, the dielectric composition may include a third subcomponent which is an oxide or carbonate containing Ba, and the third subcomponent may be included in an amount of 0.37 mol or more and 4.0 mol or less with respect to 100 mol of the main component.

The content of the third subcomponent may be based on the content of Ba element included in the third subcomponent without distinguishing an addition form such as an oxide or a carbonate.

The third subcomponent may serve to promote sintering, control a dielectric constant, and the like, in the dielectric ceramic composition, and if the content of the third subcomponent is less than 0.37 mole with respect to 100 moles of the main component, the effect may be insufficient. If exceeding 4.0 moles, there may be a problem in which the dielectric constant is lowered or the firing temperature is increased.

d) Fourth Subcomponent

According to an embodiment of the present disclosure, the dielectric composition includes, as a fourth subcomponent, at least one of an oxide including at least one of Si and Al and a glass compound including Si, and the fourth subcomponent may be included in an amount of 0.5 mol or more and 7.0 mol or less with respect to 100 mol of the main component.

The content of the fourth subcomponent may be based on the content of at least one or more elements among Si and Al included in the fourth subcomponent without distinguishing an addition form such as glass, oxide, or carbonate.

The fourth subcomponent serves to lower the firing temperature and the high temperature withstand voltage characteristics of the multilayer ceramic capacitor to which the dielectric composition is applied.

If the content of the fourth subcomponent is less than 0.5 mole with respect to 100 moles of the main component, the effect may be insufficient. If the content of the fourth subcomponent is more than 7.0 moles, there may be problems such as lowering of sinterability and density, and secondary phase generation.

Multilayer Electronic Component

FIG. 1 schematically illustrates a perspective view of a multilayer electronic component according to an embodiment of the present disclosure.

Figure 2:
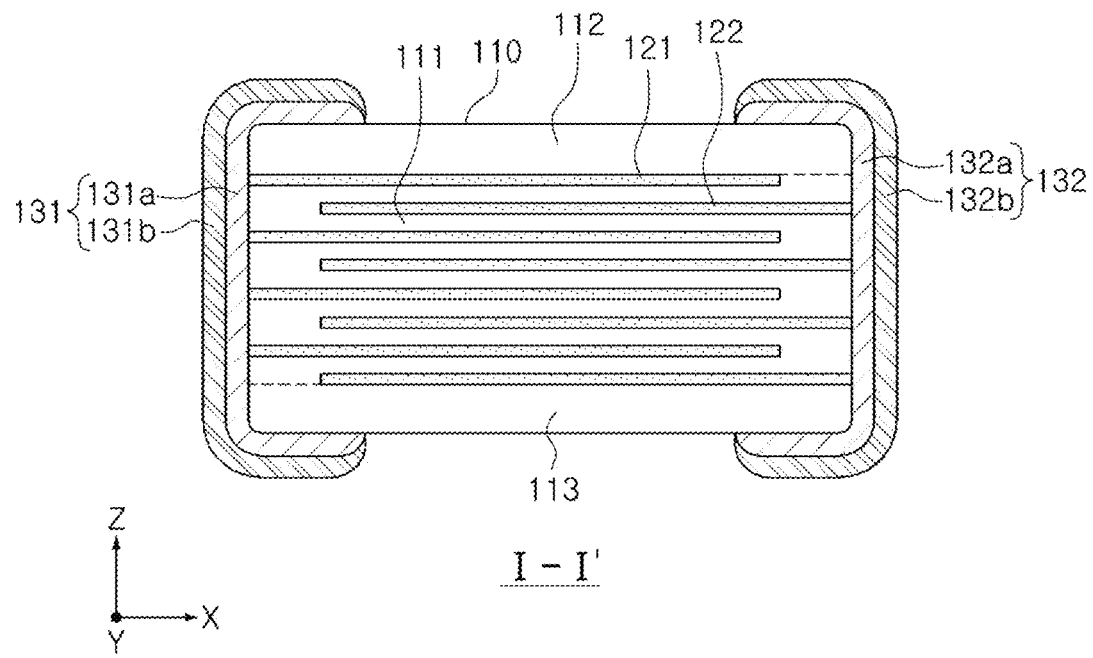
FIG. 2 is a schematic cross-sectional view taken along line I-I' of FIG. 1.

FIG. 2 is a schematic cross-sectional view taken along line I-I' of FIG. 1.

Figure 3:
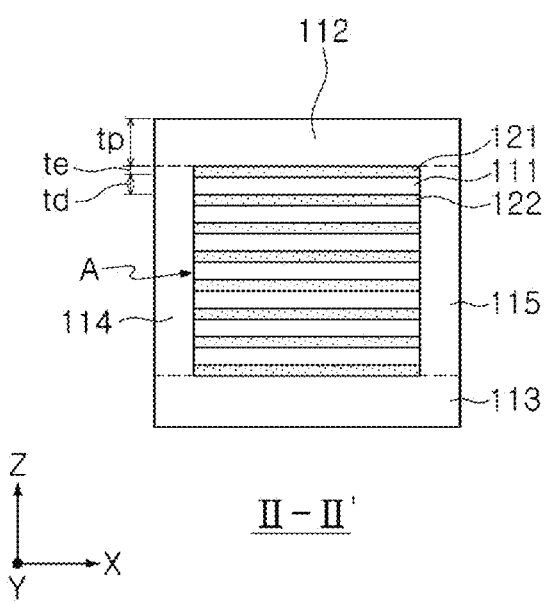
FIG. 3 schematically illustrates a cross-sectional view taken along line II-II' of FIG. 1.

FIG. 3 schematically illustrates a cross-sectional view taken along line II-II' of FIG. 1.

Figure 4:
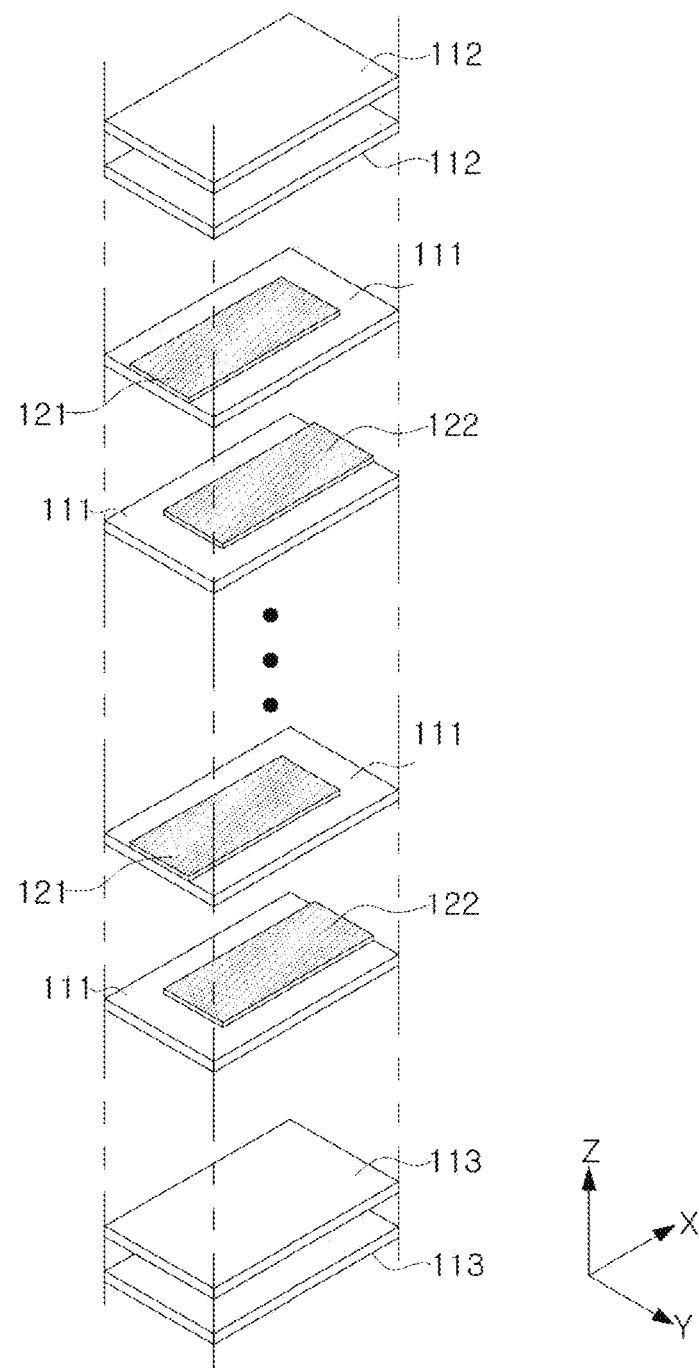
FIG. 4 is an exploded perspective view schematically illustrating a body in which a dielectric layer and an internal electrode are stacked according to an embodiment of the present disclosure.

FIG. 4 is an exploded perspective view schematically illustrating a body in which a dielectric layer and an internal electrode are stacked according to an embodiment of the present disclosure.

Referring to FIGS. 1 to 4, a multilayer electronic component 100 according to an embodiment may include a body 110 including a dielectric layer 111 and internal electrodes 121 and 122; and external electrodes 131 and 132 disposed on the body 110 and connected to the internal electrodes 121 and 122. The dielectric layer 111 includes a dielectric composition. The dielectric composition includes one of $BaTiO_3$, $(Ba,Ca)(Ti,Ca)O_3$, $(Ba,Ca)(Ti,Zr)O_3$, $Ba(Ti,Zr)O_3$ and $(Ba,Ca)(Ti,Sn)O_3$, as a main component; a first subcomponent comprising a rare earth element; and a second subcomponent comprising at least one of a variable valence acceptor element and a fixed valence acceptor element. In this case, when the sum of the rare earth element contents is defined as DT, the sum of the variable valence acceptor element and fixed valence acceptor element contents is defined as AT, (DT/AT)/(Ba+Ca) satisfies more than 0.5 and less than 6.0.

Hereinafter, the descriptions of the configurations overlapping with those described in the above-described dielectric composition will be omitted to avoid overlapping descriptions. In addition, a multilayer ceramic capacitor will be described as an example of a multilayer electronic component, but an embodiment thereof the present disclosure may be applied to various electronic products, for example, an inductor, a piezoelectric element, a varistor, a thermistor, and the like, using the above-described dielectric composition.

In the body 110, the dielectric layer 111 and the internal electrodes 121 and 122 are alternately stacked.

Although the specific shape of the body 110 is not particularly limited, as illustrated, the body 110 may be formed to have a hexahedral shape or the like. Due to the shrinkage of the ceramic powder contained in the body 110 during a firing process, the body 110 may have a substantially hexahedral shape but not a hexahedral shape having a perfect straight line.

The body 110 may have first and second surfaces 1 and 2 opposing each other in a first direction (a Z direction), third and fourth surfaces 3 and 4 connected to the first and second surfaces 1 and 2 and opposing each other in a second direction (an X direction), and fifth and sixth surfaces 5 and 6 connected to the first and second surfaces 1 and 2, connected to the third and fourth surfaces 3 and 4, and opposing each other in a third direction (a Y direction).

The plurality of dielectric layers 111 forming the body 110 are in a fired state, and adjacent dielectric layers 111 may be integrated to such an extent that it is difficult to identify the boundaries therebetween without using a scanning electron microscope (SEM).

The dielectric layer 111 may be formed using the dielectric composition described above.

As the dielectric layer 111 is formed using the above-described dielectric composition, the dielectric layer 111 may include a plurality of grains, and the plurality of grains may have an average grain size of 50 nm or more and 500 nm or less.

If the average grain size is less than 50 nm, there may be problems such as a decrease in dielectric constant, and insufficient implementation of expected effects against a lack of solid solution of additive elements, based on a decrease in grain growth rate, may occur. If the average grain size exceeds 500 nm, there is a concern that the rate of change of capacitance depending on the temperature and DC voltage may increase, and reliability may decrease due to a decrease in the number of dielectric grains per dielectric layer.

In addition, at least one or more of the plurality of crystal grains may have a core-shell structure.

As at least one of the plurality of crystal grains has a core-shell structure, the dielectric constant and the reliability may be effectively improved.

On the other hand, the body 110 may include first internal electrode 121 and second internal electrode 122 disposed inside the body 110 and disposed to face each other with the dielectric layer 111 interposed therebetween, to form a capacitance forming portion A, and cover portions 112 and 113 formed on the upper and lower portions of the capacitance forming portion A.

The capacitance forming portion A is a portion contributing to the capacitance formation of the capacitor, and may be formed by repeatedly stacking the plurality of first and second internal electrodes 121 and 122 with the dielectric layer 111 therebetween.

Upper cover portion 112 and lower cover portion 113 may be formed by stacking a single dielectric layer or two or more dielectric layers on the upper and lower surfaces of the capacitance forming portion A in a thickness direction, respectively, and basically serve to prevent damage to the internal electrode due to physical or chemical stress.

The upper cover portion 112 and the lower cover portion 113 may not include an internal electrode, and may include the same material as that of the dielectric layer 111.

For example, the upper cover portion 112 and the lower cover portion 113 may include a ceramic material, for example, may include a barium titanate ($BaTiO_3$)-based ceramic material.

Margin portions 114 and 115 may be disposed on side surfaces of the capacitance forming portion A.

The margin portions (114 and 115) include a margin portion 114 disposed on the sixth side 6 of the body 110 and a margin portion 115 disposed on the fifth surface 5 of the body 110. For example, the margin portions 114 and 115 may be disposed on both side surfaces of the ceramic body 110 in the width direction.

As illustrated in FIG. 3, the margin portions 114 and 115 may indicate areas between both ends of the first and second internal electrodes 121 and 122 and boundary surfaces of the body 110, in a cross section of the body 110 in the width-thickness (WT) direction.

The margin portions 114 and 115 may basically serve to prevent damage to the internal electrode due to physical or chemical stress.

The margin portions 114 and 115 may be formed by applying a conductive paste to a ceramic green sheet except a place in which the margin portions are to be formed to form internal electrodes.

In addition, to suppress the step difference caused by the internal electrodes 121 and 122, after the internal electrodes 121 and 122 are stacked, the internal electrodes are cut to be exposed to the fifth and sixth surfaces 5 and 6 of the body, and then, a single dielectric layer or two or more dielectric layers may also be laminated on both sides of the capacitance forming portion A in the width direction, thereby forming the margin portions 114 and 115.

The internal electrodes 121 and 122 are alternately stacked with the dielectric layer 111.

The internal electrodes (121 and 122) may include first and second internal electrodes 121 and 122. The first and second internal electrodes 121 and 122 are alternately disposed to face each other with the dielectric layer 111 constituting the body 110, interposed therebetween, and may be exposed to the third and fourth surfaces 3 and 4 of the body 110, respectively.

Referring to FIG. 2, the first internal electrode 121 is spaced apart from the fourth surface 4 and exposed through the third surface 3, and the second internal electrode 122 is spaced apart from the third surface 3 and exposed through the fourth surface 4.

In this case, the first and second internal electrodes 121 and 122 may be electrically separated from each other by the dielectric layer 111 interposed therebetween.

Referring to FIG. 3, the body 110 may be formed by alternately stacking a ceramic green sheet on which the first internal electrode 121 is printed and a ceramic green sheet on which the second internal electrode 122 is printed, and then firing the same. The material for forming the internal electrodes 121 and 122 is not particularly limited, and a material having excellent electrical conductivity may be used.

For example, the conductive paste for internal electrodes containing at least one of palladium (Pd), nickel (Ni), copper (Cu) and alloys thereof may be printed on a ceramic green sheet, thereby forming the internal electrode.

As the printing method of the conductive paste for the internal electrode, a screen-printing method or a gravure printing method may be used, but an embodiment thereof is not limited thereto.

On the other hand, to obtain miniaturization and high capacity of the multilayer ceramic capacitor, the thicknesses of the dielectric layer and the internal electrode should be relatively reduced to increase the number of stacked layers. As the thicknesses of the dielectric layer and the internal electrode are relatively reduced, the reliability may be lowered, and characteristics of insulation resistance and breakdown voltage may be lowered.

Therefore, as the thicknesses of the dielectric layer and the internal electrode are further reduced, the effect of improving reliability according to an embodiment of the present disclosure may be increased.

In detail, according to an embodiment of the present disclosure, by controlling the correlation between the rare earth element content, the variable valence acceptor element and fixed valence acceptor element contents, Ba and Ca contents contained in the dielectric composition, the insulation resistance may be improved, and the dielectric constant per grain size may be improved. Therefore, insulation resistance and dielectric constant per grain size may be significantly improved when a thickness te of the internal electrodes 121 and 122 or a thickness td of the dielectric layer 111 is 0.41 μm or less, according to an embodiment of the present disclosure.

The thickness te of the internal electrodes 121 and 122 may indicate an average thickness of the first and second internal electrodes 121 and 122.

The thickness te of the internal electrodes 121 and 122 may be measured by scanning an image of a third and first directional cross section L-T of the body 110 with a scanning electron microscope (SEM).

For example, for any internal electrode 121, 122 extracted from an image obtained by scanning the third and first directional cross-section (a WT cross-section) cut in the center of the body 110 in the second direction (the L direction), with the SEM; the thicknesses thereof may be measured at 30 equidistant points in the third direction, to measure an average value.

The thirty equidistant points may be measured in the capacitance forming portion A indicating an area in which the internal electrodes 121 and 122 overlap each other.

The thickness td of the dielectric layer 111 may indicate an average thickness of the dielectric layer 111 disposed between the first and second internal electrodes 121 and 122.

Similar to the thickness te of the internal electrode, the thickness td of the dielectric layer 111 may also be measured by scanning the third and first directional cross-section (the LT cross-section) of the body 110 with a scanning electron microscope (SEM).

For example, for any dielectric layer 111 extracted from an image obtained by scanning the third and first directional cross-section (a WT cross-section) cut in the center of the body 110 in the second direction (the L direction), with the SEM; the thickness thereof may be measured at 30 equidistant points in the third direction, to measure an average value.

The thirty equidistant points may be measured in the capacitance forming portion A indicating an area in which the internal electrodes 121 and 122 overlap each other.

Although the thicknesses of the cover portions 112 and 113 are not particularly limited, the thickness tp of the cover portions 112 and 113 may be 20 nm or less, to facilitate miniaturization and relatively high capacity of the multilayer electronic component.

The external electrodes 131 and 132 are disposed on the body 110 and are connected to the internal electrodes 121 and 122.

As illustrated in FIG. 2, the multilayer electronic component 100 may include the first and second external electrodes 131 and 132 disposed on the third and fourth surfaces 3 and 4 of the body 110, respectively, and connected to the first and second internal electrodes 121 and 122, respectively.

In this embodiment, although a structure in which the multilayer electronic component 100 has two external electrodes 131 and 132 is described, the number, shape and the like of the external electrodes 131 and 132 may be changed depending on the shapes of the internal electrodes 121 and 122 or other uses.

The external electrodes 131 and 132 may be formed using any material as long as the material has electrical conductivity such as a metal, and a detailed material thereof may be determined in consideration of electrical characteristics, structural stability, and the like. The external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

As a more detailed example of the electrode layers 131a and 132a, the electrode layers 131a and 132a may be sintered electrodes including a conductive metal and glass, or resin-based electrodes including a conductive metal and a resin.

In addition, the electrode layers 131a and 132a may have a form in which a sintered electrode and a resin-based electrode are sequentially formed on the body. The electrode layers 131a and 132a may be formed by transferring a sheet including a conductive metal on the body, or may be formed by transferring a sheet including a conductive metal on a sintered electrode.

As the conductive metal included in the electrode layers 131a and 132a, a material having excellent electrical conductivity may be used and is not particularly limited. For example, the conductive metal may be one or more of nickel (Ni), copper (Cu) and alloys thereof.

As a more detailed example of the plating layers 131b and 132b, the plating layers 131b and 132b may be an Ni plating layer or an Sn plating layer, and may have a form in which the Ni plating layer and the Sn plating layer are sequentially formed on the electrode layers 131a and 132a. The Sn plating layer, the Ni plating layer, and the Sn plating layer may be formed sequentially. In addition, the plating layers 131b and 132b may include a plurality of Ni plating layers and/or a plurality of Sn plating layers.

The size of the multilayer electronic component 100 is not particularly limited.

For example, to obtain miniaturization and high capacity at the same time, the thickness of the dielectric layer and the internal electrode should be relatively reduced to increase the number of stacked layers. Thus, the reliability and insulation resistance may be more improved in the multilayer electronic component having a size of 0603 (length×width, 0.6 mm×0.3 mm) or less.

Therefore, when the distance between the third and fourth surfaces of the body is defined as L and the distance between the fifth and sixth surfaces is defined as W, L may be 0.6 mm or less, and W may be 0.3 mm or less. For example, the multilayer electronic component 100 may be a multilayer electronic component having a size of 0603 (length×width, 0.6 mm×0.3 mm) or less.

Embodiment

In an embodiment of the present disclosure, a main additive is added to the barium titanate ($BaTiO_3$) powder of the 100 nm level as a main component to satisfy the following Table 1, a binder and an organic solvent such as ethanol are added and are wet mixed to prepare a dielectric slurry, and then, the dielectric slurry is applied and dried on a carrier film to prepare a ceramic green sheet, thereby forming a dielectric layer.

In this embodiment, the ceramic green sheet was prepared by mixing a ceramic powder, a binder, and a solvent to prepare a slurry, and the slurry was manufactured into a sheet having a thickness of 1.0 μm or less, using a doctor blade method.

Next, a conductive paste for internal electrodes including 40 to 50 parts by weight of nickel powder with an average particle size of 0.1 to 0.2 μm was prepared.

After forming the internal electrode by applying the conductive paste for the internal electrode on the green sheet by the screen-printing method, a laminate was formed by laminating the green sheet on which the internal electrode pattern is formed to about 0.3 mm thickness, and then, the laminate was pressed and cut into the 0603 size (length×width, 0.6 mm×0.3 mm).

Thereafter, the cut laminate was heated to 400° C. or lower under a nitrogen atmosphere to remove the binder, and then fired at a firing temperature of 1200° C. or lower and a hydrogen concentration of 0.5% $H_2$ or lower, followed by measuring a grain size, a dielectric constant per grain size, and insulation resistance (IR), and the measurement results are described in Table 1 below.

The grain size was obtained by measuring the average grain size by imaging a cross section, and the dielectric constant and insulation resistance per grain size were measured at 1 kHz, AC 0.5 V using an LCR meter.

The dielectric constant per grain size is indicated by ⊚ when the dielectric constant per grain size is 3600 or more as an excellent case, by ○ when it is good by 3100 to 3500, by Δ when it is normal by 2600 to 3000, and by X when it is poor by 2500 or less.

The insulation resistance is indicated by ⊚ when insulation resistance is $10^7 mΩ$ or more as an excellent case, by ○ when it is good by $10^5 mΩ$ or more and less than $10^7 mΩ$, by Δ when it is normal by $10^4 mΩ$ or more and less than $10^5 mΩ$, and by X when it is poor by less than $10^4 mΩ$.

TABLE 1

| No | La/DT | (DT/AT)/(Ba + Ca) | Dielectric Constant per Grain Size | Grain Size | Insulation Resistance |
|---|---|---|---|---|---|
| 1 | 0.10 | 0.5 | X | 310 nm | X |
| 2 | 0.25 | | X | 310 nm | X |
| 3 | 0.50 | | Δ | 305 nm | Δ |
| 4 | 0.75 | | Δ | 298 nm | Δ |
| 5 | 1.00 | | Δ | 305 nm | X |
| 6 | 0.10 | 1 | ○ | 320 nm | Δ |
| 7 | 0.25 | | ○ | 326 nm | ○ |
| 8 | 0.50 | | ○ | 330 nm | ⊚ |
| 9 | 0.75 | | ○ | 342 nm | ⊚ |
| 10 | 1.00 | | ⊚ | 326 nm | X |
| 11 | 0.10 | 2 | ○ | 340 nm | ○ |
| 12 | 0.25 | | ○ | 342 nm | ⊚ |
| 13 | 0.50 | | ○ | 329 nm | ⊚ |
| 14 | 0.75 | | ⊚ | 330 nm | ○ |
| 15 | 1.00 | | ⊚ | 332 nm | X |
| 16 | 0.10 | 3 | ○ | 330 nm | ○ |
| 17 | 0.25 | | ○ | 322 nm | ⊚ |
| 18 | 0.50 | | ⊚ | 320 nm | ⊚ |
| 19 | 0.75 | | ⊚ | 324 nm | ○ |
| 20 | 1.00 | | ⊚ | 315 nm | X |
| 21 | 0.10 | 4 | ○ | 370 nm | ○ |
| 22 | 0.25 | | ⊚ | 362 nm | ⊚ |
| 23 | 0.50 | | ⊚ | 360 nm | ○ |
| 24 | 0.75 | | ⊚ | 368 nm | Δ |
| 25 | 1.00 | | ⊚ | 354 nm | X |
| 26 | 0.10 | 5 | ⊚ | 480 nm | ○ |
| 27 | 0.25 | | ⊚ | 468 nm | ○ |
| 28 | 0.50 | | ⊚ | 460 nm | ○ |
| 29 | 0.75 | | ⊚ | 425 nm | Δ |
| 30 | 1.00 | | ⊚ | 408 nm | X |
| 31 | 0.10 | 6 | ⊚ | 588 nm | X |
| 32 | 0.25 | | ⊚ | 560 nm | X |
| 33 | 0.50 | | ⊚ | 540 nm | X |
| 34 | 0.75 | | ⊚ | 552 nm | X |
| 35 | 1.00 | | ⊚ | 520 nm | X |

In the case of Test Nos. 1 to 5 in which (DT/AT)/(Ba+Ca) was 0.5, the dielectric constant per grain size and insulation resistance were evaluated as being normal or poor.

In the case of Test Nos. 31 to 35 in which (DT/AT)/(Ba+Ca) was 6, all were evaluated as having poor insulation resistance. In addition, all had a dielectric grain size of more than 500 nm, and there is a concern that the capacity change rate depending on a temperature and a DC voltage may increase. Further, in the case of thinning the dielectric layer, there is a fear that the reliability may decrease due to the decrease in the number of dielectric grains per dielectric layer.

Therefore, it can be confirmed that there is a need to adjust (DT/AT)/(Ba+Ca) to be more than 0.5 and less than 6.0.

In addition, it can be seen that the dielectric constant per grain size increases as the content ratio of the lanthanum (La) to the sum (DT) of the rare earth element contents is increased.

However, Test Nos. 5, 10, 15, 20, 25, 30 and 35 with La/DT of 1.0 were all evaluated as having poor insulation resistance.

Therefore, it can be confirmed that the content ratio of the lanthanum (La) to the sum (DT) of rare earth element contents may be, in detail, 0.1 or more and less than 1.0.

As set forth above, according to an embodiment, by controlling the correlation between the rare earth element content, the variable valence acceptor element and fixed valence acceptor element contents, Ba and Ca contents contained in the dielectric composition, the insulation resistance may be improved, and the dielectric constant per grain size may be improved.

In addition, a dielectric composition, in which high dielectric properties may be implemented without deterioration of reliability even in a case in which the dielectric layer is thinned, and a capacity reduction rate depending on a DC voltage is not great, and a multilayer electronic component including the same, may be provided.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
    a body including a dielectric layer and an internal electrode; and
    an external electrode disposed on the body and connected to the internal electrode,
    wherein the dielectric layer includes a dielectric composition,
    wherein the dielectric composition includes:
    one of $BaTiO_3$, $(Ba,Ca)(Ti,Ca)O_3$, $(Ba,Ca)(Ti,Zr)O_3$, $Ba(Ti,Zr)O_3$ or $(Ba,Ca)(Ti,Sn)O_3$, as a main component;
    a first subcomponent comprising a rare earth element; and
    a second subcomponent comprising at least one of a variable valence acceptor element or a fixed valence acceptor element,
    wherein the dielectric layer comprises a plurality of crystal grains,
    wherein one or more of the plurality of crystal grains have a core-shell structure, and
    when a sum of contents of the rare earth element is defined as DT, and a sum of contents of the variable valence acceptor element and the fixed valence acceptor element is defined as AT, (DT/AT)/(Ba+Ca) satisfies more than 0.5 and less than 6.0.

2. The multilayer electronic component of claim 1, wherein the rare earth element comprises lanthanum (La), and further comprises at least one of yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu), and
    a content ratio (La/DT) of the lanthanum (La) to a sum (DT) of the contents of the rare earth element satisfies 0.1 or more and less than 1.0.

3. The multilayer electronic component of claim 1, wherein the first subcomponent comprises an oxide or carbonate containing the rare earth element in a range from 0.2 mol to 4.0 mol relative to 100 mol of the main component.

4. The multilayer electronic component of claim 1, wherein the variable valence acceptor element comprises at least one of Mn, V, Cr, Fe, Ni, Co, Cu or Zn, and
    the fixed valence acceptor element comprises at least one of Mg or Zr.

5. The multilayer electronic component of claim 1, wherein the second subcomponent comprises an oxide or carbonate containing at least one of a variable valence acceptor element or a fixed valence acceptor element in a range from 0.01 mol to 4.0 mol relative to 100 mol of the main component.

6. The multilayer electronic component of claim 1, wherein the dielectric composition comprises a third subcomponent, which is an oxide or carbonate comprising Ba,
    wherein the third subcomponent is included in an amount in a range from 0.37 mol to 4.0 mol with respect to 100 mol of the main component.

7. The multilayer electronic component of claim 1, wherein the dielectric composition comprises a fourth subcomponent which is at least one of an oxide comprising at least one of Si or Al or a glass compound comprising Si,
    wherein the fourth subcomponent is contained in a range from 0.5 mol to 7.0 mol with respect to 100 mol of the main component.

8. The multilayer electronic component of claim 1,
    wherein the plurality of crystal grains have an average grain size in a range from 50 nm to 500 nm.

9. The multilayer electronic component of claim 1, wherein the dielectric layer has an average thickness of 0.41 µm or less.

10. A multilayer electronic component comprising:
    a body including a dielectric layer and an internal electrode; and
    an external electrode disposed on the body and connected to the internal electrode,
    wherein the dielectric layer includes a dielectric composition,
    wherein the dielectric composition includes:
    one of $BaTiO_3$, $(Ba,Ca)(Ti,Ca)O_3$, $(Ba,Ca)(Ti,Zr)O_3$, $Ba(Ti,Zr)O_3$ or $(Ba,Ca)(Ti,Sn)O_3$, as a main component;
    a first subcomponent comprising a rare earth element; and
    a second subcomponent comprising at least one of a variable valence acceptor element or a fixed valence acceptor element,
    wherein the dielectric layer comprises a plurality of crystal grains,
    wherein one or more of the plurality of crystal grains have a core-shell structure,
    wherein the rare earth element comprises lanthanum (La), and further comprises at least one of yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu), and
    a content ratio (La/DT) of the lanthanum (La) to a sum (DT) of the contents of the rare earth element satisfies 0.1 or more and less than 1.0.

11. The multilayer electronic component of claim 10, wherein the first subcomponent comprises an oxide or carbonate containing the rare earth element in a range from 0.2 mol to 4.0 mol relative to 100 mol of the main component.

12. The multilayer electronic component of claim 10, wherein the variable valence acceptor element comprises at least one of Mn, V, Cr, Fe, Ni, Co, Cu or Zn, and
the fixed valence acceptor element comprises at least one of Mg or Zr.

13. The multilayer electronic component of claim 10, wherein the second subcomponent comprises an oxide or carbonate containing at least one of a variable valence acceptor element or a fixed valence acceptor element in a range from 0.01 mol to 4.0 mol relative to 100 mol of the main component.

14. The multilayer electronic component of claim 10, wherein the dielectric composition comprises a third subcomponent, which is an oxide or carbonate comprising Ba, wherein the third subcomponent is included in an amount in a range from 0.37 mol to 4.0 mol with respect to 100 mol of the main component.

15. The multilayer electronic component of claim 10, wherein the dielectric composition comprises a fourth subcomponent which is at least one of an oxide comprising at least one of Si or Al or a glass compound comprising Si,
wherein the fourth subcomponent is contained in a range from 0.5 mol to 7.0 mol with respect to 100 mol of the main component.

16. The multilayer electronic component of claim 10, wherein the plurality of crystal grains have an average grain size in a range from 50 nm to 500 nm.

17. The multilayer electronic component of claim 10, wherein the dielectric layer has an average thickness of 0.41 μm or less.

* * * * *